United States Patent
Kitano et al.

(10) Patent No.: US 6,835,214 B2
(45) Date of Patent: Dec. 28, 2004

(54) PROCESS FOR THE PRODUCTION OF NON-AQUEOUS ELECTROLYTE BATTERY

(75) Inventors: Shinya Kitano, Kyoto (JP); Masahiro Tagawa, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 388 days.

(21) Appl. No.: 10/171,692

(22) Filed: Jun. 17, 2002

(65) Prior Publication Data

US 2003/0005577 A1 Jan. 9, 2003

(30) Foreign Application Priority Data

Jun. 18, 2001 (JP) .................................... P. 2001-182790
Nov. 26, 2001 (JP) .................................... P. 2001-358773
Apr. 26, 2002 (JP) .................................... P. 2002-125738

(51) Int. Cl.$^7$ .............................................. H01M 6/00
(52) U.S. Cl. ..................... 29/623.2; 29/623.3; 29/623.5
(58) Field of Search ........................... 29/623.2, 623.3, 29/623.5

(56) References Cited

U.S. PATENT DOCUMENTS

| | | | |
|---|---|---|---|
| 6,024,773 A | 2/2000 | Inuzuka et al. | |
| 6,051,342 A | 4/2000 | Hamano et al. | |
| 6,124,061 A | 9/2000 | Hamano et al. | |
| 6,235,065 B1 | 5/2001 | Pasquier | |
| 6,322,923 B1 | 11/2001 | Spotnitz et al. | |
| 2001/0008735 A1 | 7/2001 | Andrieu et al. | |

FOREIGN PATENT DOCUMENTS

| | | |
|---|---|---|
| JP | 9-293518 A | 11/1997 |
| JP | 11-329501 A | 11/1999 |
| JP | 2000-223159 A | 8/2000 |
| JP | 2002-42883 A | 2/2002 |
| WO | WO 95/15589 A1 | 6/1995 |

*Primary Examiner*—Laura Weiner
(74) *Attorney, Agent, or Firm*—Sughrue Mion, PLLC

(57) ABSTRACT

A process for the production of a non-aqueous electrolyte battery which comprises a polymer layer forming step of forming a polymer layer on one side of at least one of a positive electrode, a negative electrode and a separator and an electricity-generating element preparing step of laminating or winding the positive electrode, the negative electrode and the separator to prepare an electricity-generating element. The process for the production of a non-aqueous electrolyte battery further comprises battery preparing step of receiving the electricity-generating element in a battery case, injecting an electrolyte into the battery case and then hermetically sealing the battery case to prepare a non-aqueous electrolyte battery and a heating and cooling step of heating and cooling the non-aqueous electrolyte battery while the battery case is under pressure.

18 Claims, 2 Drawing Sheets

PROCESS FOR THE PRODUCTION OF NON-AQUEOUS ELECTROLYTE BATTERY

FIELD OF THE INVENTION

The present invention relates to a process for the production of a non-aqueous electrolyte battery such as polymer battery.

BACKGROUND OF THE INVENTION

A polymer battery is a non-aqueous electrolyte battery comprising a positive electrode and a negative electrode integrally bonded to each other with a polymer layer impregnated with an electrolyte optionally with a separator interposed therebetween. Conventional processes for the production of the polymer battery will be described below.

Referring to a first process for the production of the polymer battery, a polymer material is dissolved in a solvent. The solution is then applied to the surface of a positive electrode, a negative electrode or a separator. The positive electrode and the negative electrode are laminated with the separator interposed therebetween, and then optionally wound to prepare an electricity-generating element. Subsequently, the electricity-generating element is dried to evaporate the solvent so that a polymer layer is formed, causing the positive electrode, the negative electrode and the separator to be bonded to each other. Subsequently, the electricity-generating element is received into a battery case. Into the battery case is then injected an electrolyte to impregnate the electrodes and the polymer layer with the electrolyte. Thus, a polymer battery is produced.

Referring to a second process for the production of the polymer battery, a positive electrode and a negative electrode are laminated with a polymer film interposed therebetween, and then optionally wound to prepare an electricity-generating element. Subsequently, the electricity-generating element is heated so that the polymer film is melted to form a polymer layer with which the positive electrode and the negative electrode are bonded to each other. Subsequently, the electricity-generating element is received into a battery case. An electrolyte is then injected into the battery case so that the polymer layer provided between the positive electrode and the negative electrode is impregnated with the electrolyte to prepare a polymer battery. (In this production process, a separator may be interposed between the positive electrode and the negative electrode.).

Referring to a third process for the production of the polymer battery (disclosed in JP-A-10-255849), a polymer film is prepared on the surface of a support. The polymer film is then impregnated with an electrolyte. Subsequently, the polymer film is provided interposed between a positive electrode and a negative electrode. These layers are then laminated, and then optionally wound to prepare an electricity-generating element.

Alternatively, a polymer film is prepared on the surface of a positive electrode or a negative electrode. The polymer film is then impregnated with an electrolyte to form a polymer layer. Subsequently, the electrode is laminated with the other electrode with the polymer layer interposed therebetween, and then optionally wound to prepare an electricity-generating element.

Subsequently, these electricity-generating elements are each heated under pressure so that the polymer film or polymer layer is partly melted to bond the positive electrode and the negative electrode to each other. These electricity-generating elements are each then received into a battery case to prepare a polymer battery.

However, the aforementioned conventional production processes have the following disadvantages.

In accordance with the first and second production processes, the electricity-generating element is impregnated with the electrolyte after the bonding of the positive electrode and the negative electrode with a polymer layer. In other words, the polymer layer has already been kept in close contact with the electrodes without any gap before the injection of the electrolyte. This makes it possible for the electrolyte to penetrate only into the edge of the polymer layer, requiring much time for the electrolyte to penetrate into the entire part of the polymer layer deep inside thereof. As a result, subsequent steps such as initial charge are delayed, deteriorating the battery productivity to disadvantage. This problem will be further described with reference to an example in connection with FIG. 4. FIG. 4 illustrates an electricity-generating element comprising a positive electrode 1 and a negative electrode 2 bonded to each other with the interposition of a separator 3 coated with a polymer layer 4 on both sides thereof produced by the first or second production process. When an electrolyte is injected into the battery case after bonding, the electrolyte can penetrate into the electricity-generating element only through the edge of the polymer layer 4 exposed at the positive electrode 1 and the negative electrode 2 as shown by the arrow A in FIG. 4. Similarly, the electrolyte can penetrate into the active material of the positive electrode 1 and the negative electrode 2 only through the edge thereof.

The third production process is disadvantageous in that the gel-like polymer film or layer the strength of which is deteriorated due to impregnation with the electrolyte needs to be handled, making it difficult to produce the battery. In other words, the operation involving the conveyance of the gel-like polymer film and the disposition of the gel-like polymer film between the positive electrode and the negative electrode, the operation involving the conveyance of the electrodes having a gel-like polymer layer formed thereon, the operation involving the lamination or winding of these layers, etc. cannot be easily carried out, making it difficult to produce the battery. Further, since the amount of the electrolyte to be injected is determined by the content of electrolyte in the polymer layer or polymer film, making it impossible to inject the electrolyte into the battery case invariably in a predetermined amount. Moreover, since no separator is interposed between the positive electrode and the negative electrode, internal shortcircuiting can easily occur in the battery.

SUMMARY OF THE INVENTION

The invention has been worked out to cope with such circumstances. An aim of the invention is to provide a process for the production of a non-aqueous electrolyte battery which comprises heating the electricity-generating element under pressure after the injection of the electrolyte so that the electrodes are bonded to each other with the polymer layer, allowing the electricity-generating element to be rapidly impregnated with the electrolyte and hence facilitating the production of the battery.

The invention lies in a process for the production of a non-aqueous electrolyte battery comprising the following steps. In other words, the process for the production of a non-aqueous electrolyte battery of the invention comprises a polymer layer forming step of forming a polymer layer on at least one side of at least one of a positive electrode, a negative electrode and a separator and an electricity-generating element preparing step of laminating or winding the positive electrode, the negative electrode and the separator to prepare an electricity-generating element. The process for the production of a non-aqueous electrolyte battery of the invention further comprises battery preparing step of receiving the electricity-generating element in a battery case, injecting an electrolyte into the battery case and then hermetically sealing the battery case to prepare a non-aqueous electrolyte battery and a heating and cooling step of heating and cooling the non-aqueous electrolyte battery while the battery case is under pressure.

In accordance with the present invention, the electrolyte is injected into the battery case at the battery preparing step which is before the bonding of the electricity-generating element at the heating and cooling step. Accordingly, a desired gap between the polymer layer and the electrode or the like is secured before the injection of the electrolyte into the battery case, allowing the electrolyte to penetrate into the inside of the electricity-generating element through the gap and hence allowing the electricity-generating element to be rapidly impregnated with the electrolyte from the entire surfaces of the polymer layer and the electrodes into the inside thereof. As a result, subsequent steps such as initial charge can be rapidly carried out, improving the battery productivity.

DETAILED DESCRIPTION OF THE INVENTION

Figure 4:
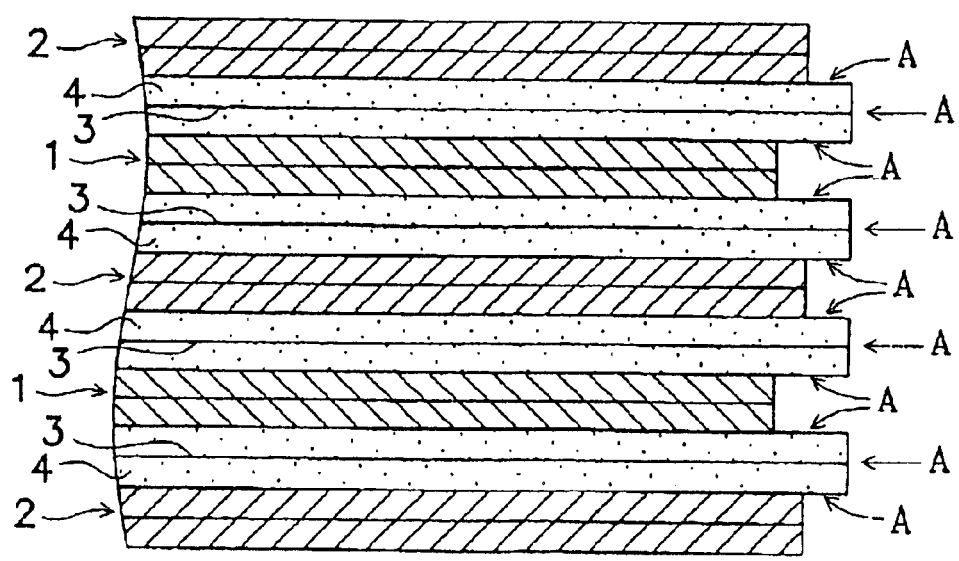
FIG. 4 is a partly enlarged vertical sectional view of a conventional example illustrating an electricity-generating element comprising a positive electrode and a negative electrode laminated and bonded to each other with a separator having a polymer layer formed on both sides thereof interposed therebetween.

The invention will be further described hereinafter with reference to one embodiment of the present invention to a laminated polymer battery in connection with the attached drawings. Where the constituent members function in the same way as those of the conventional example of FIG. 4, the same numbers are used.

Figure 1:
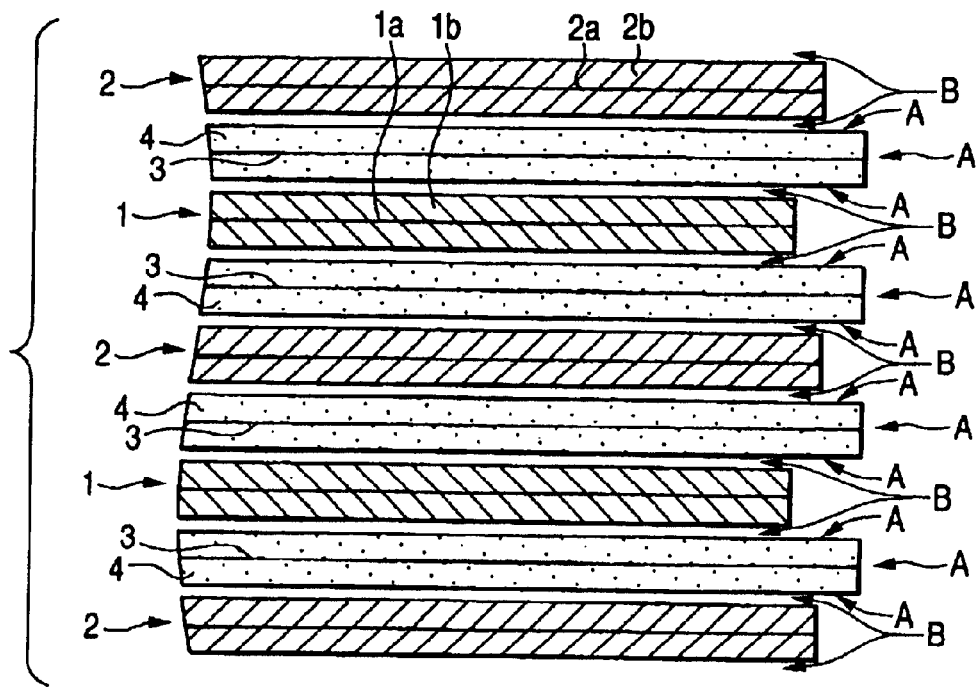
FIG. 1 is a partly enlarged vertical sectional view of one embodiment of the invention, illustrating an electricity-generating element comprising a positive electrode and a negative electrode laminated with a separator having a polymer layer formed on both sides thereof interposed therebetween.

The electricity-generating element of the polymer battery comprises a positive electrode 1 and a negative electrode 2 laminated with a separator 3 interposed therebetween as shown in FIG. 1. The positive electrode 1 comprises a positive composite layer 1b containing a positive active material (e.g., lithium cobalt composite oxide and lithium manganese composite oxide) supported on both sides of a positive electrode substrate 1a (e.g., aluminum foil). The negative electrode 2 comprises a negative composite layer 2b containing a negative active material (e.g., graphite) supported on a negative electrode substrate 2a (e.g., copper foil). As the separator 3 there may be used e.g., a polyolefin film having a microporous structure.

A polymer layer is then formed on at least one side of at least one of the positive electrode, the negative electrode and the separator (polymer layer forming step). By way of example, an embodiment will be described hereinafter with reference to the case where a polymer layer 4 is formed on both sides of the separator 3. Such a polymer layer 4 is formed by dissolving a polymer material in a solvent, applying the solution to the surface of the separator 3, and then evaporating the solvent. The polymer layer 4 is a layer selected from the group consisting of polyvinylidene fluoride (PVDF), polytetrafluoroethylene (PTFE) and a copolymer comprising vinylidene fluoride (VDF), hexafluoropropylene (HFP) and tetrafluoroethylene (TFE) or a resin comprising a mixture of such a fluoropolymer and a polymer material such as polyacrylonitrile (PAN), styrene-butadiene rubber, acrylic resin and polyester-based resin. The polymer layer 4 is preferably formed porous.

The positive electrode, the negative electrode and the separator are then laminated or wound to prepare an electricity-generating element (electricity-generating element forming step). In the polymer battery of the present embodiment, the positive electrode 1 and the negative electrode 2 are laminated with the separator 3 having the polymer layer 4 formed thereon interposed therebetween to prepare an electricity-generating element. During this procedure, the solvent is evaporated from the polymer layer 4 on both sides of the separator 3 to cause the polymer layer 4 to be dried. Thus, the separator can be easily handled in working. At the electricity-generating element preparing step, the positive electrode 1 and the negative electrode 2 are merely superposed with the separator 3 interposed therebetween. There occurs a small gap between the polymer layer 4 and the positive electrode 1 and negative electrode 2 as shown.

The aforementioned electricity-generating element is then received into a battery case. Then, the electrolyte is injected into the battery case. The battery case is then hermetically sealed to prepare a non-aqueous electrolyte battery (battery preparing step).

The battery case is not specifically limited. Examples of the battery case include a battery case comprising a battery can or battery container comprising a metal, resin or the like having an opening portion and a cover portion welded, bonded or hot-welded to the battery can or battery container covering the opening portion. Alternatively, a battery case obtained by forming a laminated film having a metal foil laminated with a resin film on both sides thereof into a bag, and then hot-welding the bag at the opening thereof. The electrolyte is a non-aqueous electrolyte having a lithium salt or the like dissolved in an organic solvent. This electrolyte is normally injected into the battery case in an ordinary atmosphere. Alternatively, the electrolyte may be injected into the battery case under reduced pressure. Further, the battery case into which the electrolyte has been injected may be kept under substantially reduced pressure to accelerate the penetration of the electrolyte. The battery case into which the electricity-generating element has been received and the electrolyte has been injected is then sealed at the aperture so that it is hermetically sealed. At the battery preparing step, the injection of the electrolyte may be followed by the initial charge of the electricity-generating element to e.g., 3.6 V/cell. When initially charged, a solid electrolyte interface can be certainly formed on the negative electrode 2 before the bonding of the polymer layer 4, making it possible to improve the cycle life performance and safety of the battery. However, since a gas is produced at the initial charge, charge is preferably effected before the sealing of the battery case.

When the electrolyte is injected into the battery case at the aforementioned battery preparing step, the electrolyte penetrates into the edge of the polymer layer 4 exposed between the positive electrode 1 and the negative electrode 2 as shown by the arrow A in FIG. 1. As shown by the arrow B in FIG. 1, the electrolyte penetrates into the gap between the polymer layer 4 and the positive electrode 1 and negative electrode 2 and then reaches the central part of the electricity-generating element through capillary action. Thus, the electrolyte penetrates into the polymer layer 4 from the entire surface thereof. Similarly, the electrolyte penetrates into the positive electrode compound layer 1b of the positive electrode 1 and the negative electrode compound layer 2b of the negative electrode 2 from the edge portion and the entire surface thereof.

Subsequently, the polymer battery obtained at the aforementioned battery preparing step is heated and cooled while the battery case is being pressed (heating and cooling step). When the polymer battery is heated, the polymer layer 4 in the electricity-generating element swells or is partially melted. When the polymer battery is then cooled, the polymer layer 4 returns to solid or gel state. At the heating and cooling step, since the battery case is under pressure, the polymer layer 4 which has swollen or has been partially melted on heating and the electrodes 1, 2, etc. are kept in close contact with each other so that they are bonded to each other.

At the heating and cooling step, the battery case is preferably pressed during cooling. When the battery case is pressed during cooling, the polymer layer 4 which has swollen or has been partially melted on heating is cooled while being caught by the compound layers 1b and 2b of the electrodes 1 and 2, respectively, further assuring the bonding of the polymer layer 4 to the electrodes 1 and 2, etc.

Further, it is particularly preferred that the battery case be pressed during heating and cooling at the heating and cooling step. Since the polymer layer 4 is pressed against the surface of the electrodes 1 and 2 when it is melted and softened not only during cooling but also during heating, the polymer layer 4 can be further caught by the compound layers 1b and 2b, raising the bonding between the polymer layer 4 and the compound layers 1b and 2b.

The pressing of the battery case is preferably effected in such an arrangement that it is clamped on both sides thereof in the laminating direction if a laminated electricity-generating element is used as in the present embodiment. In the case of wound electricity-generating element, the battery case is preferably pressed on the entire surfaces of the element having the larger area in the radial direction.

Heating at the aforementioned heating and cooling step is most preferably effected such that the highest temperature of the electricity-generating element in the polymer battery falls within a range of from not lower than 60° C. to not higher than 100° C. When the heating temperature falls below 60° C., it is not likely that the polymer layer 4 can be melted thoroughly enough for bonding. On the contrary, when the heating temperature exceeds 100° C., the polymer layer 4 is melted excessively, possibly impairing the porosity of the porous polymer layer 4 or causing the polymer layer 4 to be melted from the gap between the positive electrode 1 and the negative electrode 2. Further, when the heating temperature is even higher, a gas can be produced from the polymer layer 4, the electrolyte, etc., causing troubles such as expansion of battery case. The heating time is preferably from not smaller than 5 minutes to less than 5 hours to give assured and sufficient bonding. The temperature rising rate during heating is preferably not smaller than 0.01° C./sec. The temperature falling rate during cooling to 50° C. is preferably not smaller than 0.005° C./sec. This is because when a high temperature state is kept for a long period of time, the polymer layer 4, the electrolyte, etc. can be modified or can produce a gas. However, when the electricity-generating element is cooled to a temperature of not higher than 50° C. during cooling, bonding can be certainly effected. Therefore, when the electricity-generating element is rapidly cooled to a temperature of not higher than 50° C., the time required for this step can be reduced.

As mentioned above, in accordance with the present embodiment of the process for the production of polymer battery, the electrolyte is injected at the battery preparing step before the bonding of the electricity-generating element at the heating and cooling step. Therefore, the electrolyte can rapidly penetrate into the core of the electricity-generating element through a capillary action caused by the gap secured between the polymer layer 4 and the electrodes 1 and 2 from the entire surface of the polymer layer 4 and the electrodes 1 and 2. As a result, subsequent steps such as initial charge can be rapidly effected, raising the battery productivity.

Further, since the heating and cooling step is carried out with the battery case hermetically sealed, a gas which has possibly been produced by the vaporization of the electrolyte, etc. during heating cannot be released out, allowing safe production.

Moreover, since the electrodes 1 and 2 and the separator 3 are laminated with the polymer layer 4 free of electrolyte at the electricity-generating element preparing step, it is not likely that the electricity-generating element can hardly be prepared as in the handling of gel-like polymer layer 4. Further, since the electrolyte can be injected into the battery case in a predetermined amount at the battery preparing step, the injected amount of the electrolyte cannot vary widely. Moreover, the non-aqueous electrolyte battery produced by the production process of the invention comprises a separator provided interposed between electrodes and thus can hardly undergo internal shortcircuiting.

While the aforementioned embodiment has been described with reference to the case where the polymer layer 4 is formed on the separator 3, the polymer layer 4 may be formed on either or both of the positive electrode 1 and the negative electrode 2 or may be formed on all of the positive electrode 1, the negative electrode 2 and the separator 3. The polymer layer 4 may be formed on one or both sides of these layers.

While the aforementioned embodiment has been described with reference to a polymer battery comprising a laminated electricity-generating element, the invention can be applied to a polymer battery comprising a wound electricity-generating element. The invention can be applied also to non-aqueous electrolyte batteries other than polymer battery so far as they comprise an electricity-generating element having a positive electrode 1 and a negative electrode 2 bonded to each other with a polymer layer 4 with a separator 3 interposed therebetween.

The invention will be further described in the following examples, but the invention should not be construed as being limited thereto.

EXAMPLES 1 to 10

As non-aqueous electrolyte batteries of Examples 1 to 10 there were prepared non-aqueous electrolyte batteries comprising an ellipsoidally-wound electricity-generating element made of a positive electrode, a separator and a negative electrode received in a metal-laminated resin film case with a non-aqueous electrolyte (not shown). The metal-laminated resin film case was prepared by hot-welding a metal-laminated resin film.

Figure 2:
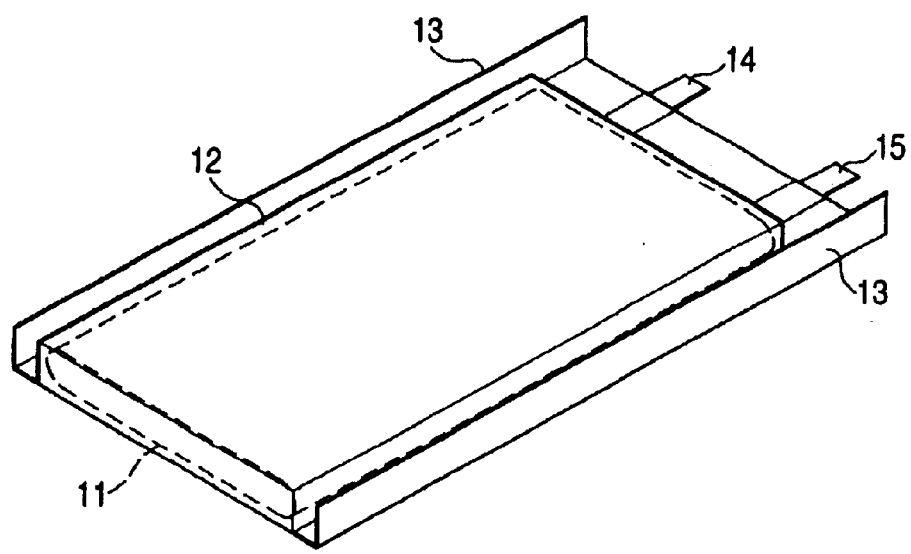
FIG. 2 is a perspective view of one example of the invention illustrating the external appearance of a non-aqueous electrolyte battery.

The external appearance of the non-aqueous electrolyte batteries of Examples 1 to 10 is shown in FIG. 2. In FIG. 2, the reference numeral 11 indicates an electricity-generating element, the reference numeral 12 indicates a battery case, the reference numeral 13 indicates the welded portion of the battery case, the reference numeral 14 indicates a positive electrode terminal, and the reference numeral 15 indicates a negative electrode terminal.

The positive electrode was prepared by mixing 90% by weight of a lithium cobalt composite oxide as a positive active material, 6% by weight of PVDF as a binder and 4% by weight of an acetylene black as an electrically-conducting agent, adding N-methyl-2-pyrrolidone (NMP) to the mixture in a proper amount to prepare a pasty material, applying the pasty material to both sides of a current collector, and then drying the coated material. As the current collector for the positive electrode there was used an aluminum foil having a thickness of 20 μm.

The negative electrode was prepared by mixing 92% by weight of graphite as a negative active material and 8% by weight of PVDF as a binder, adding N-methylpyrrolidone to the mixture in a proper amount to prepare a pasty material, applying the pasty material to both sides of a current collector, and then drying the coated material. As the current collector for the negative electrode there was used a copper foil having a thickness of 15 μm.

The positive electrode and negative electrode were then pressed and formed such that the thickness and width thereof reached 150 μm and 160 μm, respectively, and 48 mm and 49 mm, respectively. To the positive electrode and the negative electrode were each then welded a lead terminal to obtain a positive electrode and a negative electrode for non-aqueous electrolyte battery, respectively.

As the separator there was used one obtained by forming a porous PVDF-HFP copolymer layer on both sides of a microporous polyethylene film having a thickness of 20 μm and a width of 50 mm to a thickness of 5 μm each for one side. The porous PVDF-HFP copolymer layer was formed in the following manner. In some detail, to a microporous polyethylene film was applied an NMP solution of PVDF-HFP copolymer. The microporous polyethylene film was then dipped in purified water. Thereafter, the microporous polyethylene film was dried at a temperature of 60° C. to form a porous PVDF-HFP copolymer layer on the surface of the microporous polyethylene film. In this method, NMP in the polymer solution was removed in purified water, and then replaced by purified water to render the PVDF-HFP porous. The coated amount of the porous PVDF-HFP copolymer was 10 g/m$^2$.

The positive electrode, the negative electrode and the separator were then laminated in this order. Subsequently, the laminate was ellipsoidally wound on an ellipsoidal polyethylene core to form an electricity-generating element having a size of 50 mm×35 mm×3 mm.

A fixing tape made of polyethylene having a length corresponding to the width of the electrode was stuck to the side wall of the electricity-generating element to fix the winding of the electricity-generating element.

Subsequently, the electricity-generating element was received into the concave surface of the metal-laminated resin film case which had previously been deep-drawn. The metal-laminated resin film case was then hot-welded on the lead terminal side thereof and one side thereof to form a bag. Subsequently, into the case was vacuum-injected a 4:6 (by volume) mixture of ethylene carbonate and diethyl carbonate containing 1 mol/l of LiPF$_6$ through the opening left unwelded. The injected amount of the electrolyte was such that no free electrolyte is present outside the electricity-generating element.

Thereafter, the metal-laminated resin film was hot-welded at the opening with suction to seal the battery case.

Figure 3:
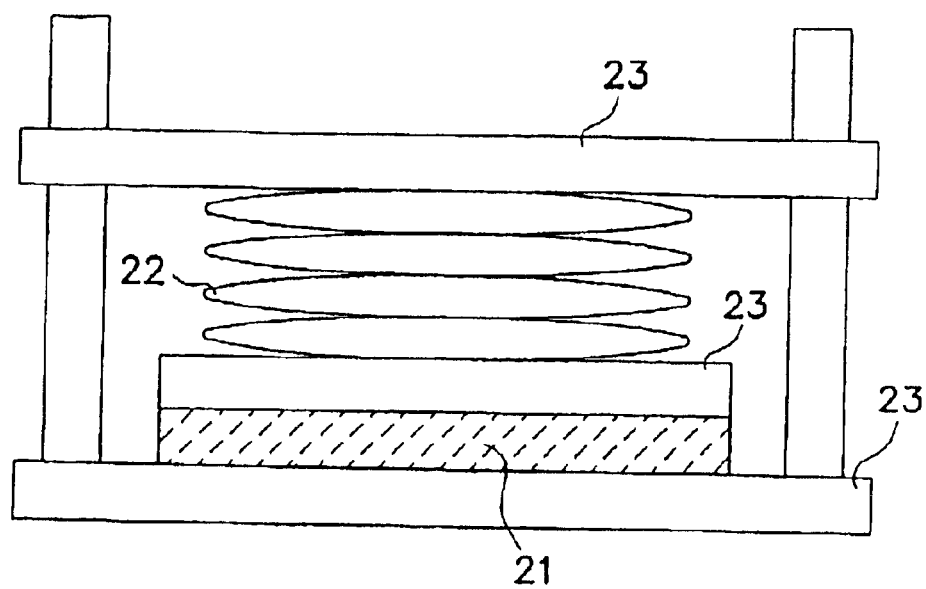
FIG. 3 is a diagram of one example of the invention illustrating a battery pressing jig.

The non-aqueous electrolyte battery thus obtained was then allowed to stand in various temperature constant temperature baths for 30 minutes while being pressed at various pressures set forth in Table 1 using a battery pressing jig shown in FIG. 3. In FIG. 3, the reference numeral 21 indicates a battery, the reference numeral 22 indicates a compression spring, and the reference numeral 23 indicates an SUS plate. Thereafter, the non-aqueous electrolyte battery was allowed to cool to room temperature in 30 minutes while being pressed at pressures set forth in Table 1. In this manner, non-aqueous electrolyte batteries A1 to A10 having a rated capacity of 500 mAh were prepared.

EXAMPLE 11

In Example 11, a non-aqueous electrolyte battery comprising the same constituent elements as used in Examples 1 to 10 was prepared in the same manner as in Examples 1 to 10 except that pressing was not effected during heating at the heating and cooling step but effected at a pressure of 0.1 MPa/cm$^2$ only during cooling at the heating and cooling step. The battery thus obtained is referred to as "A11".

EXAMPLE 12

In Example 12, a non-aqueous electrolyte battery comprising the same constituent elements as used in Examples 1 to 10 was prepared in the same manner as in Examples 1 to 10 except that pressing was not effected during cooling at the heating and cooling step but effected at a pressure of 0.1 MPa/cm$^2$ only during heating at the heating and cooling step. The battery thus obtained is referred to as "A12".

COMPARATIVE EXAMPLE 1

In Comparative Example 1, a non-aqueous electrolyte battery comprising the same constituent elements as used in Examples 1 to 10 was prepared in the same manner as in Examples 1 to 10 except that pressing was not effected both during heating and cooling at the heating and cooling step. The battery thus obtained is referred to as "A13".

COMPARATIVE EXAMPLE 2

The production process of Comparative Example 2 will be described hereinafter. As the positive electrode and negative electrode there were used the same materials as used in Examples 1 to 10. As the separator there was used a microporous polyethylene film. An NMP solution of PVDF-HFP copolymer was then applied to the microporous polyethylene film. The positive electrode, the separator and the negative electrode were laminated in this order before the drying of the polymer solution on the separator. The laminate was then ellipsoidally wound on an ellipsoidal polyethylene core. The electricity-generating element thus obtained was then dried at a temperature of 80° C. for 5 hours while being pressed at a pressure of 0.1 MPa/cm$^2$ using a pressing jig shown in FIG. 3 to remove NMP and bond the positive electrode to the separator and the negative electrode to the separator with PVDF-HFP copolymer.

Similarly to Example 1 to 10, the electricity-generating element was then received into the metal-laminated resin film case. Into the metal-laminated resin film case was then injected the electrolyte. The metal-laminated resin film case was then sealed at the opening thereof to prepare a non-aqueous electrolyte battery of Comparative Example 2. The battery thus obtained is referred to as "B1".

COMPARATIVE EXAMPLE 3

The production process of Comparative Example 3 will be described hereinafter. As the positive electrode and negative electrode there were used the same materials as used in Example 1 to 10. As the separator there was used a porous polymer single-layer film of PVDF-HFP copolymer. The positive electrode, the separator and the negative electrode were laminated in this order. The laminate was then ellipsoidally wound on an ellipsoidal polyethylene core. The electricity-generating element thus obtained was heated to a temperature of 145° C., which is the melting point of PVDF-HFP copolymer, while being pressed at a pressure of 0.1 MPa/cm$^2$ using a pressing jig shown in FIG. 3 to allow the polymer film to be melted, and then cooled to obtain an electricity-generating element comprising positive and negative electrodes bonded to each other with a polymer layer (PVDF-HFP copolymer).

Similarly to Example 1 to 10, the electricity-generating element was then received into-a metal-laminated resin film case. Into the metal-laminated resin film case was then injected the electrolyte. The metal-laminated resin film case was then sealed at the opening thereof to prepare a non-aqueous electrolyte battery of Comparative Example 3. The battery thus obtained is referred to as "B2".

Subsequently, these non-aqueous electrolyte batteries were each confirmed for penetration of electrolyte and adhesivity between electrodes. The non-aqueous electrolyte batteries were each disassembled, and then confirmed to see if the electrolyte had penetrated into the electrodes from all over the surface thereof (penetration of electrolyte) and if the positive electrode and the separator and the negative electrode and the separator had been bonded to each other with the polymer layer (adhesion). The results are set forth in Table 1. Further, the non-aqueous electrolyte batteries of Comparative Examples 2 and 3 were each allowed to stand for 1 hour from sealing so that the time between the injection of electrolyte and the disassembly for examination was the same as in the inventive example, and then disassembled for examination.

For the evaluation of penetration of electrolyte, those showing an area unwet with electrolyte in a proportion of not smaller than 20% of the total area of the electrodes were evaluated as x, those showing an area unwet with electrolyte in a proportion of smaller than 20% but some of the total area of the electrodes were evaluated as Δ, and those showing an area wet with electrolyte all over the surface of the electrodes were evaluated as ○. For the evaluation of bonding between the electrodes, those showing no bonding between the electrodes were evaluated as x, those showing bonding between the electrodes in a proportion of less than 60% of the area of the electrodes were evaluated as Δ, those showing bonding between the electrodes in a proportion of not smaller than 60% to less than 90% of the area of the electrodes were evaluated as ○ and those showing bonding between the electrodes in a proportion of not smaller than 90% of the area of the electrodes were evaluated as ⊙.

TABLE 1

| Battery No. | Bonding process | During heating | | During cooling | Penetration of electrolyte | Bonding |
| --- | --- | --- | --- | --- | --- | --- |
| | | Pressure (MPa/cm$^2$) | Temperature (° C.) | Pressure (MPa/cm$^2$) | | |
| A1 | Heating under pressure | 0.1 | 60 | 0.1 | ○ | Δ |
| A2 | Heating under pressure | 0.1 | 70 | 0.1 | ○ | ○ |
| A3 | Heating under pressure | 0.1 | 80 | 0.1 | ○ | ⊙ |
| A4 | Heating under pressure | 0.1 | 90 | 0.1 | ○ | ⊙ |
| A5 | Heating under pressure | 0.1 | 100 | 0.1 | ○ | ⊙ |
| A6 | Heating under pressure | 0.1 | 110 | 0.1 | ○ | ⊙ |
| A7 | Heating under pressure | 0.01 | 90 | 0.01 | ○ | Δ |
| A8 | Heating under pressure | 0.03 | 90 | 0.03 | ○ | ○ |
| A9 | Heating under pressure | 0.05 | 90 | 0.05 | ○ | ○ |

TABLE 1-continued

| Battery No. | Bonding process | During heating Pressure (MPa/cm²) | Temperature (° C.) | During cooling Pressure (MPa/cm²) | Penetration of electrolyte | Bonding |
|---|---|---|---|---|---|---|
| A10 | Heating under pressure | 0.5 | 90 | 0.5 | ○ | ⊙ |
| A11 | Heating under pressure | None | 90 | 0.1 | ○ | ⊙ |
| A12 | Heating under pressure | 0.1 | 90 | None | ○ | Δ |
| A13 | Heating under pressure | None | 90 | None | ○ | X |
| B1 | Removal of solvent | — | — | — | x | ⊙ |
| B2 | Solvent welding | — | — | — | x | ⊙ |

As can be seen in the aforementioned results, since the production process of the invention involves the injection of the electrolyte before the bonding of the electricity-generating element at the heating and cooling step, the electrolyte is allowed to penetrate rapidly into the interior of the electricity-generating element. In particular, by pressing the electricity-generating element during cooling, bonding can be fairly effected. The pressure during pressing is preferably not smaller than 0.03 MPa/cm². The heating temperature during pressing is preferably not lower than 60° C.

While the invention has been described in detail and with reference to specific embodiments thereof, it will be apparent to one skilled in the art that various changes and modifications can be made therein without departing from the scope thereof.

This application is based on Japanese patent applications No. 2001-182790 filed Jun. 18, 2001, No. 2001-358773 filed Nov. 26, 2001, and No. 2002-125738, filed Apr. 26, 2002, the entire contents thereof being hereby incorporated by reference.

What is claimed is:

1. A process for the production of a non-aqueous electrolyte battery comprising:
   (1) a polymer layer forming step of forming a polymer layer on at least one side of at least one of a positive electrode, a negative electrode and a separator;
   (2) an electricity-generating element preparing step of laminating or winding the positive electrode, the negative electrode and the separator to prepare an electricity-generating element;
   (3) a battery preparing step of receiving the electricity-generating element in a battery case, injecting an electrolyte into the battery case and then hermetically sealing the battery case to prepare a non-aqueous electrolyte battery; and
   (4) a heating and cooling step of heating and cooling the non-aqueous electrolyte battery while the battery case is under pressure.

2. The process for the production of a non-aqueous electrolyte battery according to claim 1, wherein the battery case is pressed during cooling at the heating and cooling step.

3. The process for the production of a non-aqueous electrolyte battery according to claim 2, wherein the highest temperature of the electricity-generating element during heating at the heating and cooling step is from not lower than 60° C. to not higher than 100° C.

4. The process for the production of a non-aqueous electrolyte battery according to claim 3, wherein the electricity-generating element is initially charged before the hermetic sealing of the battery case after the injection of an electrolyte at the battery preparing step.

5. The process for the production of a non-aqueous electrolyte battery according to claim 3, wherein the battery case is pressed at a pressure of not lower than 0.03 MPa.

6. The process for the production of a non-aqueous electrolyte battery according to claim 2, wherein the electricity-generating element is initially charged before the hermetic sealing of the battery case after the injection of an electrolyte at the battery preparing step.

7. The process for the production of a non-aqueous electrolyte battery according to claim 2, wherein the battery case is pressed at a pressure of not lower than 0.03 MPa.

8. The process for the production of a non-aqueous electrolyte battery according to claim 1, wherein the battery case is pressed during heating and cooling at the heating and cooling step.

9. The process for the production of a non-aqueous electrolyte battery according to claim 8, wherein the highest temperature of the electricity-generating element during heating at the heating and cooling step is from not lower than 60° C. to not higher than 100° C.

10. The process for the production of a non-aqueous electrolyte battery according to claim 9, wherein the electricity-generating element is initially charged before the hermetic sealing of the battery case after the injection of an electrolyte at the battery preparing step.

11. The process for the production of a non-aqueous electrolyte battery according to claim 9, wherein the battery case is pressed at a pressure of not lower than 0.03 MPa.

12. The process for the production of a non-aqueous electrolyte battery according to claim 8, wherein the electricity-generating element is initially charged before the hermetic sealing of the battery case after the injection of an electrolyte at the battery preparing step.

13. The process for the production of a non-aqueous electrolyte battery according to claim 8, wherein the battery case is pressed at a pressure of not lower than 0.03 MPa.

14. The process for the production of a non-aqueous electrolyte battery according to claim 1, wherein the highest temperature of the electricity-generating element during heating at the heating and cooling step is from not lower than 60° C. to not higher than 100° C.

15. The process for the production of a non-aqueous electrolyte battery according to claim 14, wherein the electricity-generating element is initially charged before the hermetic sealing of the battery case after the injection of an electrolyte at the battery preparing step.

16. The process for the production of a non-aqueous electrolyte battery according to claim 14, wherein the battery case is pressed at a pressure of not lower than 0.03 MPa.

17. The process for the production of a non-aqueous electrolyte battery according to claim 1, wherein the electricity-generating element is initially charged before the hermetic sealing of the battery case after the injection of an electrolyte at the battery preparing step.

18. The process for the production of a non-aqueous electrolyte battery according to claim 1, wherein the battery case is pressed at a pressure of not lower than 0.03 MPa.

* * * * *